United States Patent [19]

Wright

[11] 4,037,430
[45] July 26, 1977

[54] ROLL-END SPINDLE COUPLING
[75] Inventor: John Wright, Baltimore, Md.
[73] Assignee: Koppers Company, Inc., Pittsburgh, Pa.
[21] Appl. No.: 632,672
[22] Filed: Nov. 17, 1975
[51] Int. Cl.$^2$ ............................................. F16D 3/18
[52] U.S. Cl. ........................................... 64/9 R; 64/6
[58] Field of Search ......................... 64/9, 8, 6, 7

[56] References Cited
U.S. PATENT DOCUMENTS

| 2,845,781 | 8/1958 | O'Brien | 64/9 R |
| 2,906,106 | 9/1959 | Haas | 64/9 |
| 3,673,814 | 7/1972 | Carman | 64/9 R |

FOREIGN PATENT DOCUMENTS

| 1,043,196 | 9/1966 | United Kingdom | 64/9 |

Primary Examiner—Samuel Scott
Assistant Examiner—Randall Heald
Attorney, Agent, or Firm—Thomas L. Sivak; Oscar B. Brumback

[57] ABSTRACT

In a roll-end spindle coupling, a thrust ring having a spherical surface that coacts with a flex hub is maintained in such coacting relation by an end ring secured to the roll-end coupling sleeve.

3 Claims, 1 Drawing Figure

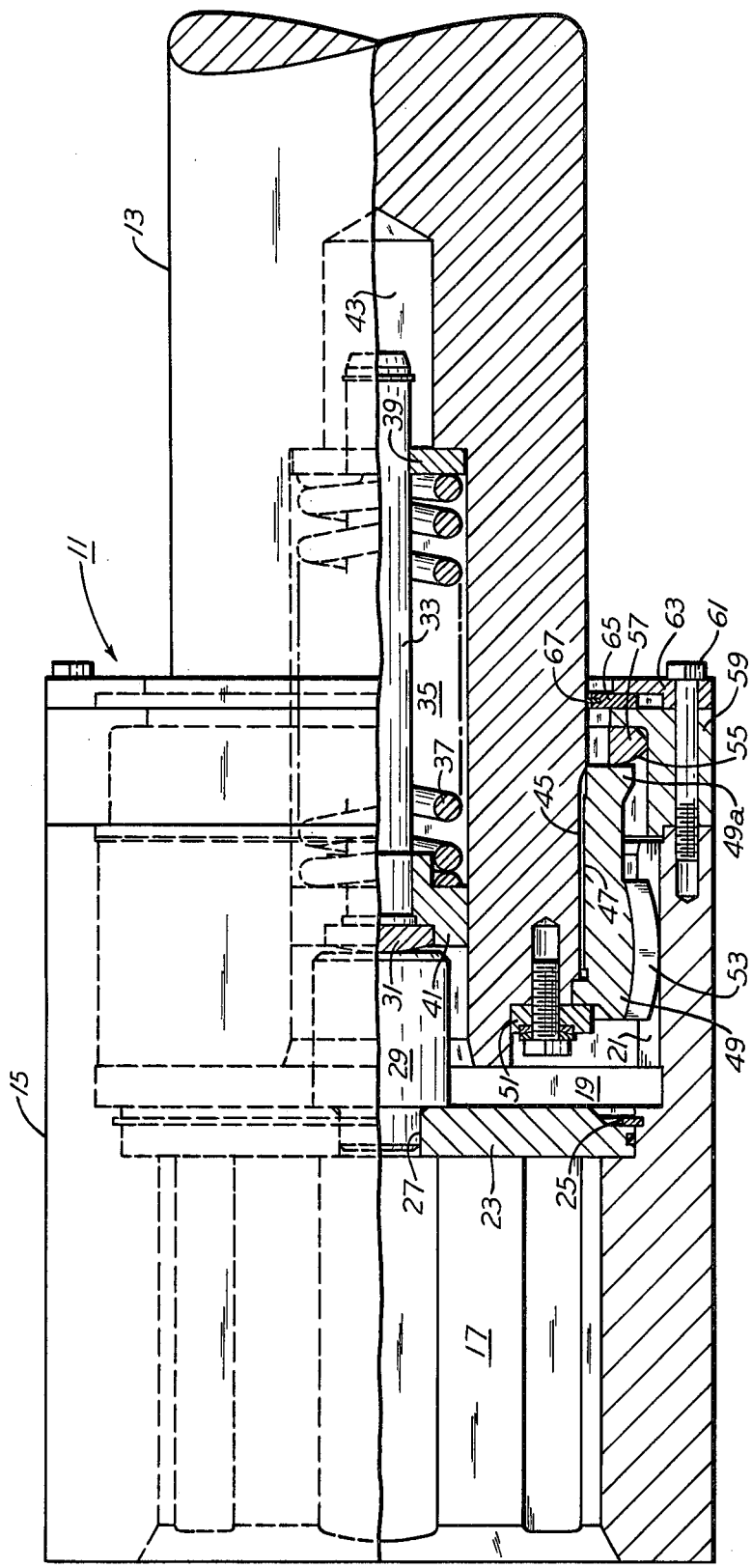

ROLL-END SPINDLE COUPLING

BACKGROUND OF THE INVENTION

The present invention relates to couplings and, more particularly, to spindle couplings of the type used in connecting a powered prime mover to the rolls of a rolling mill or connecting the pinion stand to the rolls, as well as to like apparatus.

The usual type of spindle coupling presently employed in rolling mill practice includes a coupling sleeve at each end of a spindle shaft. The coupling sleeve at one end connects drivingly to a prime mover or pinion stand and at the other end to the spade end of a roll in the rolling mill.

When it is necessary to change a roll in a mill, the roll is withdrawn from the roll-end coupling sleeve and a new roll is inserted into the coupling sleeve.

When the roll is withdrawn, the coupling sleeve, acting under the influence of gravity, tends to sag and thereby become misaligned axially with the spindle. The coupling sleeve is so misaligned that it is difficult to insert the roll spade end thereinto unless the coupling sleeve is raised by applying an external force to it, which is costly and time consuming.

U.S. Pat. No. 2,845,781 shows and describes a form of universal coupling of the type used for connecting together a rotary prime mover, or the pinion stands associated therewith, and the rolls of a rolling mill. The coupling shown includes an annular stop ring 51 that is secured by studs 52 to the end of the casing 24. An inwardly projecting portion 53 axially extends toward the hub portion 33 and, in service, is spaced apart therefrom a short distance. When the roll end is withdrawn from the casing, the internal spring urges the projecting portion 53 to engage with the hub portion 33 and thereby keep the casing in axial alignment with the spindle.

Further, those skilled in the art will recognize that the spindle coupling of U.S. Pat. No. 2,845,781 exerts thrust forces on connected machinery bearings which can lead to the failure of such bearings.

However, those skilled in the art will recognize, from the following description of the embodiment of the present invention shown in the drawing, that an aligning thrust force acts continually between the hub and a thrust ring, and axial movement of the roll relative to the spindle does not result in axial movement of the coupling sleeve. Also, no thrust is imposed on connected thrust bearings and no bearing failures can result from axial thrust forces.

SUMMARY OF THE INVENTION

A thrust ring surrounds the shaft of a spindle coupling and the ring has a spherical surface that coacts with a flex hub within the sleeve portion of a roll-end spindle coupling. The thrust ring is maintained in such contacting relation by an end ring secured to the sleeve portion. If desired, the thrust ring may be formed integrally with the end ring and the spherical surface may be formed on the end of the flex hub.

For a further understanding of the invention and for features and advantages thereof, reference may be made to the following description and the drawing which illustrates a preferred embodiment of equipment in accordance with the invention.

BRIEF DESCRIPTION OF THE DRAWING

The drawing illustrates one embodiment of an improved roll-end spindle coupling sleeve in accordance with the invention.

DETAILED DESCRIPTION

Referring to the drawing, it illustrates a roll-end spindle coupling 11 on one end of a spindle shaft 13. The spindle coupling 11 comprises a hollow sleeve 15 having an internal bore cavity 17 at one end to receive and cooperate with a roll spade end (not shown) of a rolling mill.

The other end of the hollow sleeve 15 has an internal bore cavity 19, and the inner wall of such bore cavity 19 is provided with integrally formed involute straight gear teeth 21.

A thrust plate 23 effectively separates the two internal bore cavities 17, 19 and it is disposed within the hollow sleeve 15 at a location about midway along its length. The thrust plate 23 cooperates with a retaining ring 25 to keep it in place and it has an axial hole 27 at its center which receives and cooperates with one end of a thrust cylinder 29, disposed as shown.

The thrust cylinder 29 coacts at its other end with a spring guide thrust button 31 mounted to a spring guide rod 33. The spring guide rod 33 is axially disposed within an axial bore 35 of the shaft 13, and a compression spring 37 is disposed within the bore and surrounds the spring guide rod 33. The spring 37 coacts with a thrust washer 39 at one end of the bore 35 and with a spring guide plunger 41 surrounding the rod 33 and coacting with the thrust button 31. A short reentrant axial bore 43 is provided at the end of the main bore 35 to accommodate the free end of the spring guide rod 33.

The end portion of the shaft 13, within the bore cavity 35 is provided with spline teeth 45 that coact with internal spline grooves 47 on the inner wall of a flex hub 49 secured onto the shaft end portion. The flex hub 49 is secured in a fixed position by means of an annular retainer ring 51 bolted as shown to the shaft 13.

The flex hub 49 is provided with gear teeth 53 having the arcuate profile suggested in the drawing. The teeth 53 coact drivingly with the straight involute teeth 21 on the inner wall of the bore cavity 19.

The end portion 49a of the flex hub 49 opposite the gear teeth 53 abuts a spherical surface 55 of an annular thrust ring 57 that also abuts an annular end ring 59. The end ring 59 is secured in place by bolts 61 that pass through an end ring plate 63, the end ring 59, and that are threaded into the sleeve 15. Between the end ring 59 and the end ring plate 63 there is an annular seal ring 65 that carries a retaining ring 67 like that sold and marketed under the trademark SPIROLOX RETAINING RING.

It will be noted that, in the apparatus shown in the drawing and described herein, the aligning thrust force is always present between the flex hub 49 and the thrust ring 57. Therefore, axial movement of a mill roll relative to the spindle roll sleeve is not necessary for the aligning device to be operable. Also, in the embodiment of the invention shown and described there is no thrust force acting on connected shaft bearings.

It should also be understood that the thrust ring 57 may be formed integrally with the end ring 59 if desired; thus, the end ring 59 would include spherical surface 55 coacting directly against the end portion 49a of flex hub 49 rather than having the end ring 59 act against the flex hub 49 through the thrust ring 57. Conversely, the end ring 59 may be formed with a flat surface as shown and the spherical surface 55 formed on the end portion 49a of flex hub 49 in such proportions that the end ring 59 coacts with the spherical surface on the hub. In this manner, the aligning thrust force is always present between the end ring 59 and the flex hub 49, whether or not a separate thrust ring 57 is used, to maintain coaxial alignment of the sleeve 15 with the shaft 13.

Although the invention has been described herein with a certain degree of particularly it is understood that the present disclosure has been made only as an example and that the scope of the invention is defined by what is hereinafter claimed.

What is claimed is:

1. In a spindle coupling comprising a shaft and a roll end sleeve on one end of said shaft, and resiliant means mounted to said shaft that coacts with a plunger abutting a thrust plate in said sleeve, and a flex hub surrounding the end of said shaft, with carrying means drivingly connecting said sleeve to said shaft, the improvement therewith comprising:
    a. first means disposed around said shaft, said first means coacting with and being in continous operable engagement with said flex hub; and
    b. second means secured to said sleeve and coacting with and maintaining said first means in continuous operable engagement with said flex hub, said first means and second means cooperating to prevent an external axial force from being applied to the driving or driven machine bearings.
2. The invention of claim 1 wherein:
    a. said first means is a thrust ring having an arcuate surface coacting with said flex hub.
3. The invention of claim 1 wherein:
    a. said second means is an end ring.

* * * * *